(12) United States Patent
Lee et al.

(10) Patent No.: US 8,982,037 B2
(45) Date of Patent: Mar. 17, 2015

(54) METHOD AND APPARATUS FOR PROVIDING ADDITIONAL INFORMATION THROUGH DISPLAY

(75) Inventors: Kyung-Woo Lee, Gyeonggi-do (KR); Dae-Kwang Jung, Gyeonggi-do (KR); Jeong-Seok Choi, Gyeonggi-do (KR); Hong-Seok Shin, Gyeonggi-do (KR); Sung-Bum Park, Gyeonggi-do (KR); Ki-Uk Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 694 days.

(21) Appl. No.: 12/882,505

(22) Filed: Sep. 15, 2010

(65) Prior Publication Data

US 2011/0063510 A1 Mar. 17, 2011

(30) Foreign Application Priority Data

Sep. 16, 2009 (KR) ........................ 10-2009-0087540

(51) Int. Cl.
G09G 3/36 (2006.01)
H04N 5/445 (2011.01)
H04B 10/116 (2013.01)
G09G 5/00 (2006.01)
G02F 1/1335 (2006.01)
G09G 3/34 (2006.01)

(52) U.S. Cl.
CPC ...... *H04B 10/116* (2013.01); *G09G 2320/0646* (2013.01); *G09G 5/006* (2013.01); *G09G 2320/064* (2013.01); *G02F 1/133605* (2013.01); *G09G 3/3426* (2013.01); *G09G 2370/16* (2013.01)
USPC .............................. 345/102; 345/87; 348/563

(58) Field of Classification Search
CPC ......... G09G 3/34; G09G 3/3406; G09G 3/36; G09G 5/10; G09G 3/3426; G09G 2320/0646; G09G 2360/16; G09G 2320/064; G09G 3/342; G09G 3/3648; G09G 2320/0233; G09G 3/3413; G09G 5/00; H04B 10/116; G02F 1/133603
USPC ............... 345/87–102, 690; 348/563, E5.099
See application file for complete search history.

(56) References Cited

U.S. PATENT DOCUMENTS

| | | | |
|---|---|---|---|
| 2007/0024571 A1* | 2/2007 | Maniam et al. | 345/102 |
| 2007/0058987 A1* | 3/2007 | Suzuki | 398/183 |
| 2009/0002265 A1* | 1/2009 | Kitaoka et al. | 345/4 |
| 2009/0175594 A1* | 7/2009 | Ann et al. | 386/95 |
| 2009/0213063 A1* | 8/2009 | Shimura | 345/102 |

* cited by examiner

*Primary Examiner* — Hong Zhou
(74) *Attorney, Agent, or Firm* — The Farrell Law Firm, P.C.

(57) ABSTRACT

A display device for providing additional information using Visible Light Communication (VLC), including a decoder for dividing an input signal into a video signal and a data signal including additional information on at least one object included in an image output through the video signal; a display; a VLC controller for receiving the data signal from the decoder and encoding the data signal in accordance with a VLC protocol to output the data signal as a visible light signal through the VLC; light source blocks, which include light sources, back light the display, and output the data signal encoded in accordance with the VLC; and a control unit for controlling the encoded data signal including the additional information on the object, to be output as the visible light signal through a light source block at a position corresponding to the object from among the light source blocks.

12 Claims, 8 Drawing Sheets

METHOD AND APPARATUS FOR PROVIDING ADDITIONAL INFORMATION THROUGH DISPLAY

PRIORITY

This application claims priority to an application entitled "Method And Apparatus For Providing Additional Information Through Display" filed with the Korean Intellectual Property Office on Sep. 16, 2009 and assigned Serial No. 10-2009-0087540, the contents of which are incorporated herein by reference.

BACKGROUND OF THE INVENTION

1. Field of the Invention

The present invention relates to a display using a Light Emitting Diode (LED) as a back light for a display, such as a Liquid Crystal Display (LCD), a projection TV, an Organic Light Emitting Diode (OLED) display, and more particularly to a method and an apparatus for providing additional information through a display by applying visible light communication to an LED used as a back light of the display.

2. Description of the Related Art

As luminous efficiency of LEDs improves, and the price of LEDs decreased, the LED has been generalized in general lighting markets, including fluorescent lamps, incandescent electric lamps and special lighting markets, including portable devices, displays, cars, traffic lights, billboards and the like. White LED has already surpassed incandescent electric lamps in terms of luminous efficiency, and white LED products superior to fluorescent lamps have recently emerged. Also, various factors, such as the exhaustion of RF bandwidth frequency, interference possibilities between several wireless communication technologies, an increasing demand for communication security, the advent of an ultra-high speed ubiquitous communication environment based on 4G wireless technologies, etc., have recently increased interest in optical wireless communication technologies complementary to RF technologies. Accordingly, research on visible light communication employing a visible light LED is now in progress by many enterprises and laboratories.

An LED has a color range similar to other conventional lighting sources, and thus its utilization in a display field has been further expanded. Accordingly, the LED is now used as a back light for an LCD, a projection TV, etc. The LCD has a more competitive power than a Plasma Display Panel (PDP) in terms of price, and its market has gradually expanded. Projection televisions have occupied the market for television displays over 50 inches. Also, in a computer monitor market, there is tendency that nearly all manufactured monitors are LCD monitors.

Meanwhile, as an element constituting a Back Light Unit (BLU) of an LCD TV changes from a Cold Cathode Fluorescent Lamp (CCFL) to an LED, a dimming technique for controlling the brightness of a backlight of the LCD has changed from a conventional global dimming technique for simultaneously turning on/off all of the lights of the BLU, to a local dimming technique.

In the local dimming technique, the BLU is divided into a plurality of areas, and brightness of each area is independently controlled. For example, in this technique, for an area corresponding to a dark part of a screen, the backlight is turned off, and for another area corresponding to a light part, brightness of the backlight is raised. This can significantly improve the contrast and the sharpness of an LCD, compared to conventional techniques.

However, when such a display device, such as an LCD, displays to-be-displayed contents, there is no method for providing additional information besides information displayed through the screen. In general only one component of display information can be delivered via a single display.

SUMMARY OF THE INVENTION

Accordingly, the present invention has been made to solve the above-mentioned problems occurring of conventional systems, and the present invention provides a method and an apparatus for providing additional information, in which in a display device using a Light Emitting Diode (LED) as a back light, such as a Liquid Crystal Display (LCD), a projection TV, or the like, additional information is delivered according to each part of a display screen by using visible light communication, thereby allowing a user to watch the information displayed on the display and at the same time to additionally receive corresponding additional information through a preset visible light receiver. Also, the present invention provides a terminal for receiving the additional information provided from the display device.

In accordance with an aspect of the present invention, there is provided a display device for providing additional information by using visible light communication, the display device including a decoder for dividing an input signal into a video signal, and a data signal including additional information on at least one object included in an image output through the video signal; a display for receiving the video signal from the decoder, and outputting the received video signal; a visible light communication controller for receiving the data signal from the decoder, and encoding the data signal in accordance with a visible light communication protocol in order to output the data signal as a visible light signal through the visible light communication; a plurality of light source blocks which include a plurality of light sources, perform a role of a back light of the display, and output the data signal encoded in accordance with the visible light communication protocol as the visible light signal; and a control unit for controlling the encoded data signal including the additional information on the object, to be output as the visible light signal through a light source block at a position corresponding to the object from among the plurality of light source blocks.

In accordance with another aspect of the present invention, there is provided a method for providing additional information by using visible light communication in a display device, the method dividing, by a decoder, an input signal into a video signal, and a data signal including additional information on at least one object output through the video signal; outputting the video signal through a display; encoding, by a visible light communication controller, the data signal in accordance with a visible light communication protocol in order to output the data signal as a visible light signal through the visible light communication; and outputting the additional information on the object included in the encoded data signal, as the visible light signal, through a light source block at a position corresponding to the object.

In accordance with a further aspect of the present invention, there is provided a terminal for receiving additional information from a display device by using visible light communication, the terminal including a visible light communication unit for receiving a visible light signal output at a specific position on a screen of the display device, and decoding the received visible light signal, the visible light signal including additional information on an object displayed on the specific position; a control unit for extracting the additional information on the object displayed on the specific position on the screen of the display device, from the decoded signal; a display unit for displaying display data corresponding to the extracted additional information; an input unit for receiving input of a user operation signal; and a storage unit for storing the extracted additional information.

In accordance with a still further aspect of the present invention, there is provided a method for receiving additional information by using visible light communication from a display device, the method positioning a terminal at a specific position on a screen of the display device; receiving, by the terminal, a visible light signal output at the specific position on the screen of the display device, and decoding the received visible light signal, the visible light signal including additional information on an object displayed on the specific position; extracting the additional information on the object displayed on the specific position on the screen of the display device, from the decoded signal; and displaying display data corresponding to the extracted additional information through a display unit of the terminal.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE PREFERRED EMBODIMENTS

Hereinafter, an apparatus and an operation method according to embodiments of the present invention will be described in detail with reference to the accompanying drawings. Particulars found in the following description of the present invention, such as specific configuration elements, etc., are provided only to help comprehensive understanding of the present invention, and it is obvious to those skilled in the art that various changes in form and details may be made in the particulars without departing from the spirit and scope of the invention. For the purposes of clarity and simplicity, a detailed description of known functions and configurations incorporated herein will be omitted as it may make the subject matter of the present invention rather unclear.

Figure 1:
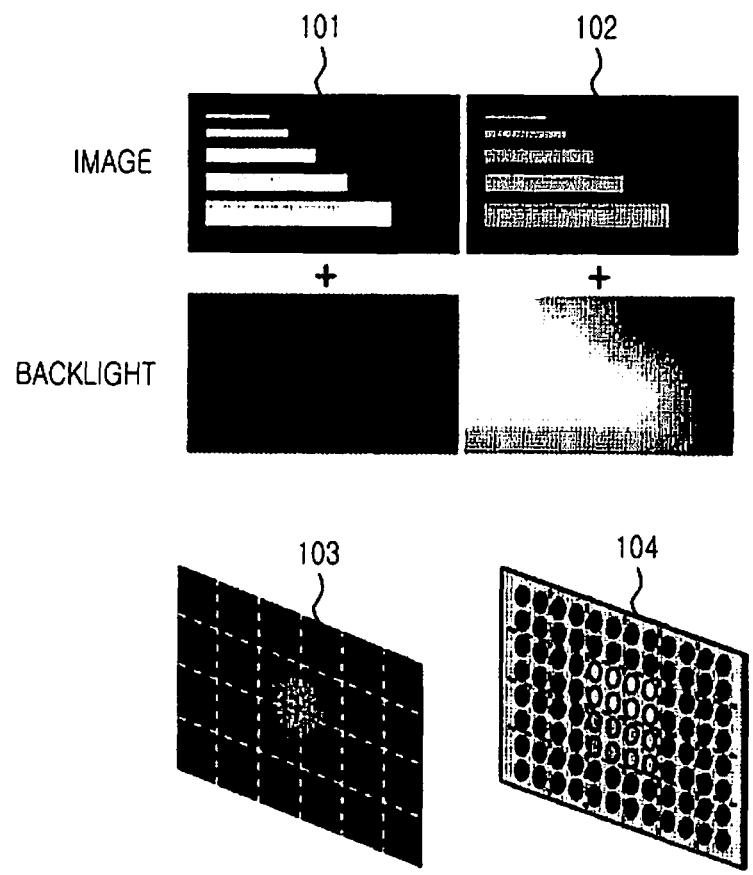
FIG. 1 illustrates a characteristic of a general local dimming technique.

A method according to the present invention provides additional information is provided through a display unit by applying a communication function using visible light communication to a Light Emitting Diode (LED) or an Organic Light-Emitting Diode (OLED) used as a back light in a conventional display, such as a Liquid Crystal Display (LCD). Also, different information is delivered to respective LED blocks, and thus additional information is provided related to contents displayed on a specific area of a screen. In FIG. 1, reference numeral 101 indicates an image and a backlight shape when employing a global dimming technique, and reference numeral 102 indicates an image and a backlight shape when employing a local dimming technique.

As shown in FIG. 1, when global dimming, the backlight is illuminated with the same brightness in the entire area. When local dimming, a backlight area corresponding to a lighter part of an image is illuminated with a higher brightness than other areas.

Reference number 103 in FIG. 1 denotes image blocks in a local dimming system, and reference number 104 denotes LED blocks in a local dimming system. As shown in FIG. 1, in the image blocks, a backlight area corresponding to a lighter part is illuminated with a higher brightness than other areas.

As shown in FIG. 1, in local dimming, a signal is transmitted with different illumination intensities according to brightness in respective parts of a screen. Herein, to control of dimming, Pulse Width Modulation (PWM) is used. The signals of "1" and "0", which are transmitted after being pulse width modulated, are transmitted to Non-Return-to-Zero (NRZ) data signals, so that different information can be carried to respective areas simultaneously when a screen is displayed.

Figure 2:
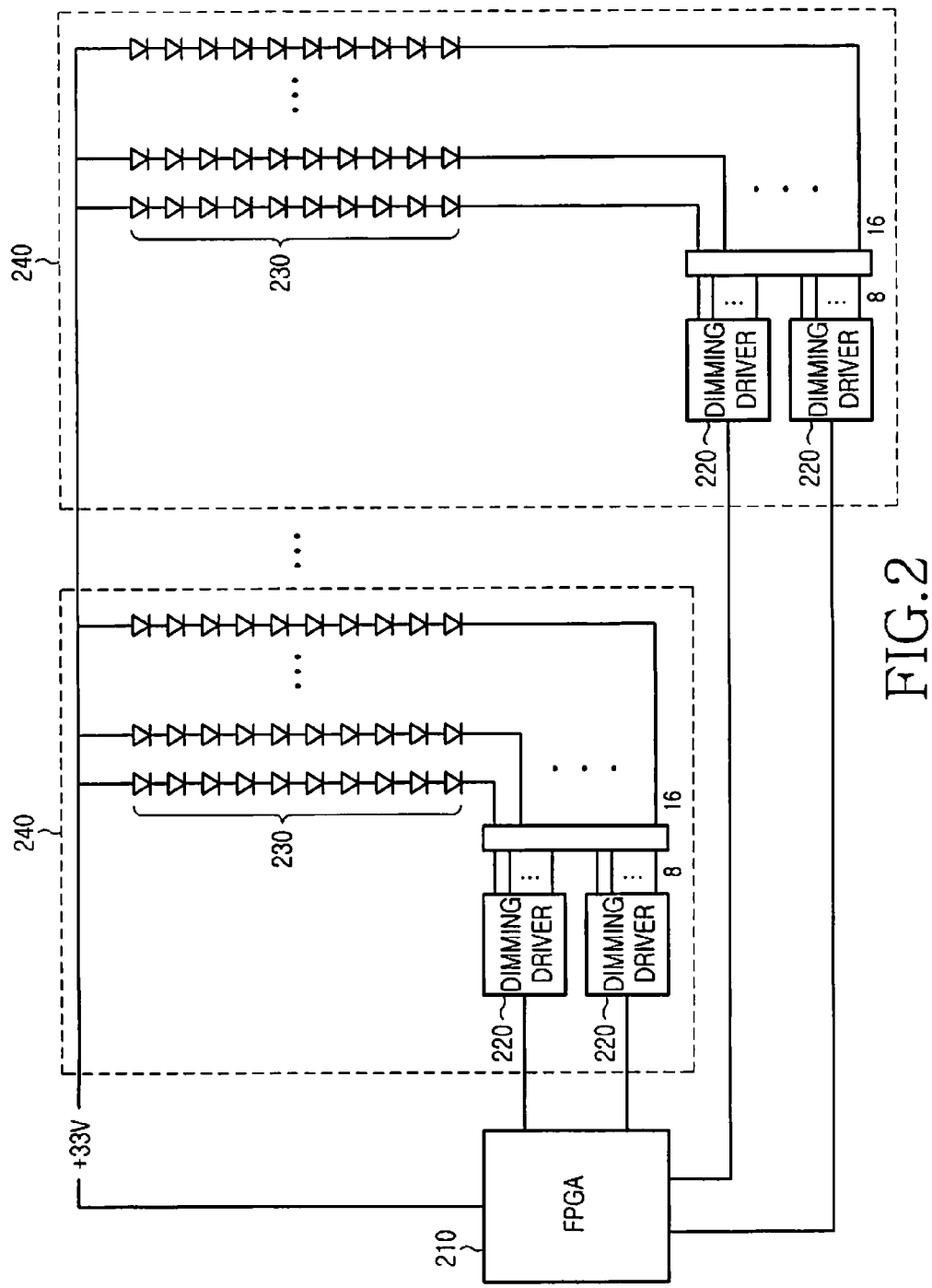
FIG. 2 is a block diagram illustrating an example of an LCD TV with an LED BLU employing a conventional local dimming technique.

As shown in FIG. 2, in the LCD TV using the LED BLU employing the conventional local dimming technique, ten LEDs constitute one LED block 230.

For example, in a 46-inch TV, sixteen LED blocks 230 constitute one LED block group 240, and four LED block groups 240 constitute an entire LED BLU. Accordingly, a total of sixty-four LED blocks 230, that is, six hundred and forty LEDs, are used.

Each LED block 230 is designed with ten LEDs serially connected to control current flow. Between the LED blocks 230 and Field Programmable Gate Array (FPGA) 210, a dimming driver 220 for performing PWM is provided to control the brightness of the LED blocks 230.

Figure 3:
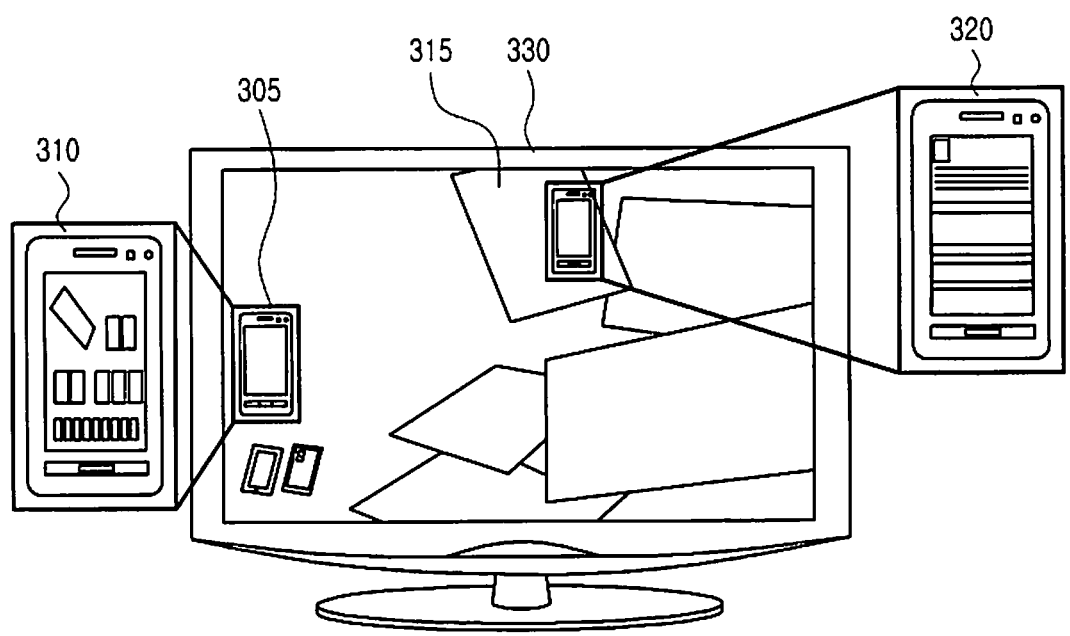
FIG. 3 schematically illustrates a technique for delivering different information to a display unit's different positions when additional information is provided through a display according to an embodiment of the present invention.

As shown in FIG. 3, in the present invention, to-be-displayed contents are displayed via a display device 330, according to the present invention. At the same time, when a terminal provided with a visible light communication receiver approaches part of a screen, a user can selectively receive additional information on an object of an image currently displayed on the approached area of the screen. The terminal receives a visible light signal output from a specific position of the display device 330, and the visible light signal output from the specific position of the display device 330 is a visible light signal output from a BLU via a display panel. The visible light signal output from the specific position of the display device includes additional information on an object of an image currently displayed on the specific position of the screen of the display device 330 according to a video signal, and the object may include various types of objects to be displayed on the screen, such as characters, things, contents, icons, signs, regions and symbols.

For example, referring to FIG. 3, when a mobile user terminal closely approaches an entertainer's photo 315 displayed on a screen of display device 330, the mobile terminal can receive information on the corresponding entertainer 320. Meanwhile, when the mobile terminal approaches a specific cellular phone 305 displayed on the screen, the user's mobile terminal can additionally receive information on the cellular phone 305 displayed on the screen 310.

Figure 4:
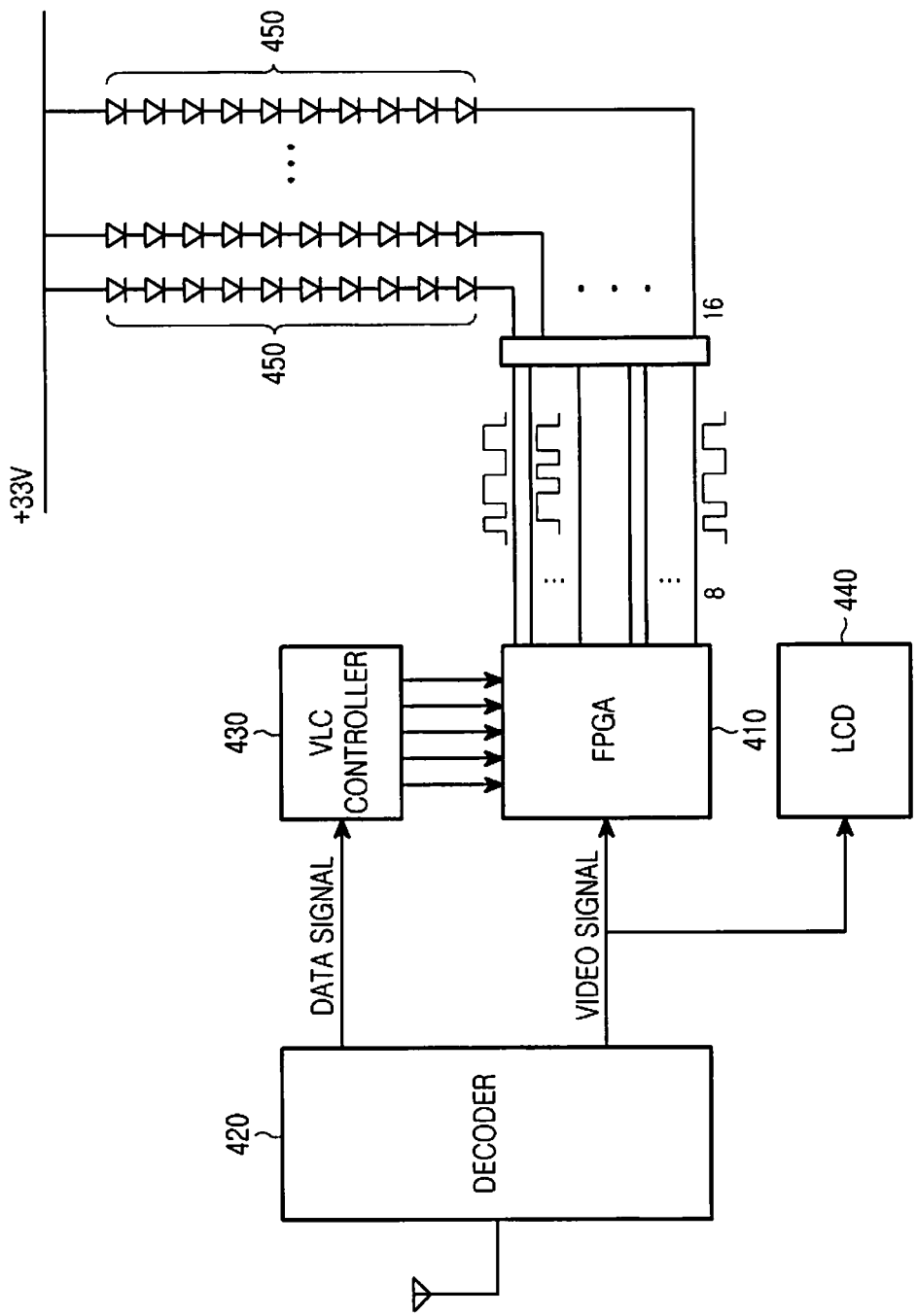
FIG. 4 is a block diagram of a device for providing additional information in an LCD TV with an LED BLU employing a local dimming technique, according to an embodiment of the present invention.

As shown in FIG. 4, a device for providing additional information in an LCD TV with an LED BLU employing a local dimming technique, according to an embodiment of the present invention, includes a decoder 420, a Visible Light Communication (VLC) controller 430, the FPGA 410, an LCD 440, and a plurality of LED blocks 450.

The decoder 420 divides a received signal into a video signal to be output through the LCD 440, and a data signal including additional information on the video signal. The data signal includes individual additional information to be delivered according to each LED block, and a data signal for each LED block is delivered by using visible light communication via a corresponding LED block.

The data signal is transferred to the VLC controller 430, and the video signal is transferred to a buffer (not shown) of the FPGA 410 and the LCD 440.

The VLC controller 430 encodes the data signal received from the decoder 420 in accordance with a visible light communication protocol to deliver the data signal as a visible light signal and transfers the encoded signal to the FPGA 410. Herein, different data signals may be delivered according to respective LED blocks 450. Also, in the present invention, since the data signal to be transmitted is added with a PWM signal for dimming control, the data signal is encoded with a frequency ten or more times higher than the PWM signal. Accordingly, a seamless data signal may be included (i.e. inserted) in an interval shared by the PWM signal.

The FPGA 410 controls the encoded signal received from the VLC controller 430, to be delivered as a visible light signal through the LED blocks 450. Also, in an embodiment of the present invention, the FPGA 410 carries out dimming control by PWM.

The LCD 440 outputs the video signal received from the decoder 420.

The plurality of LED blocks 450 perform a role of a back light, and at the same time deliver additional information using a visible light communication protocol. Each of the LED blocks 450 is configured by serially connecting a predetermined number of LEDs.

Meanwhile, in an embodiment of the present invention, since the FPGA 410 controls each of the LED blocks 450 by controlling current flowing to a ground of each LED, an additional dimming driver is not required. Since the dimming control is performed by adding the NRZ signal to the PWM signal, the dimming can be controlled with the pulse width of the PWM signal. Accordingly, in an embodiment of the present invention, the FPGA 410 is embedded with a dimming driver and the VLC controller 430. However, in another embodiment of the present invention, an FPGA 510 of a conventional LCD TV is added with a VLC controller 530. Hereinafter, another embodiment of the present invention is described with reference to FIG. 5.

Figure 5:
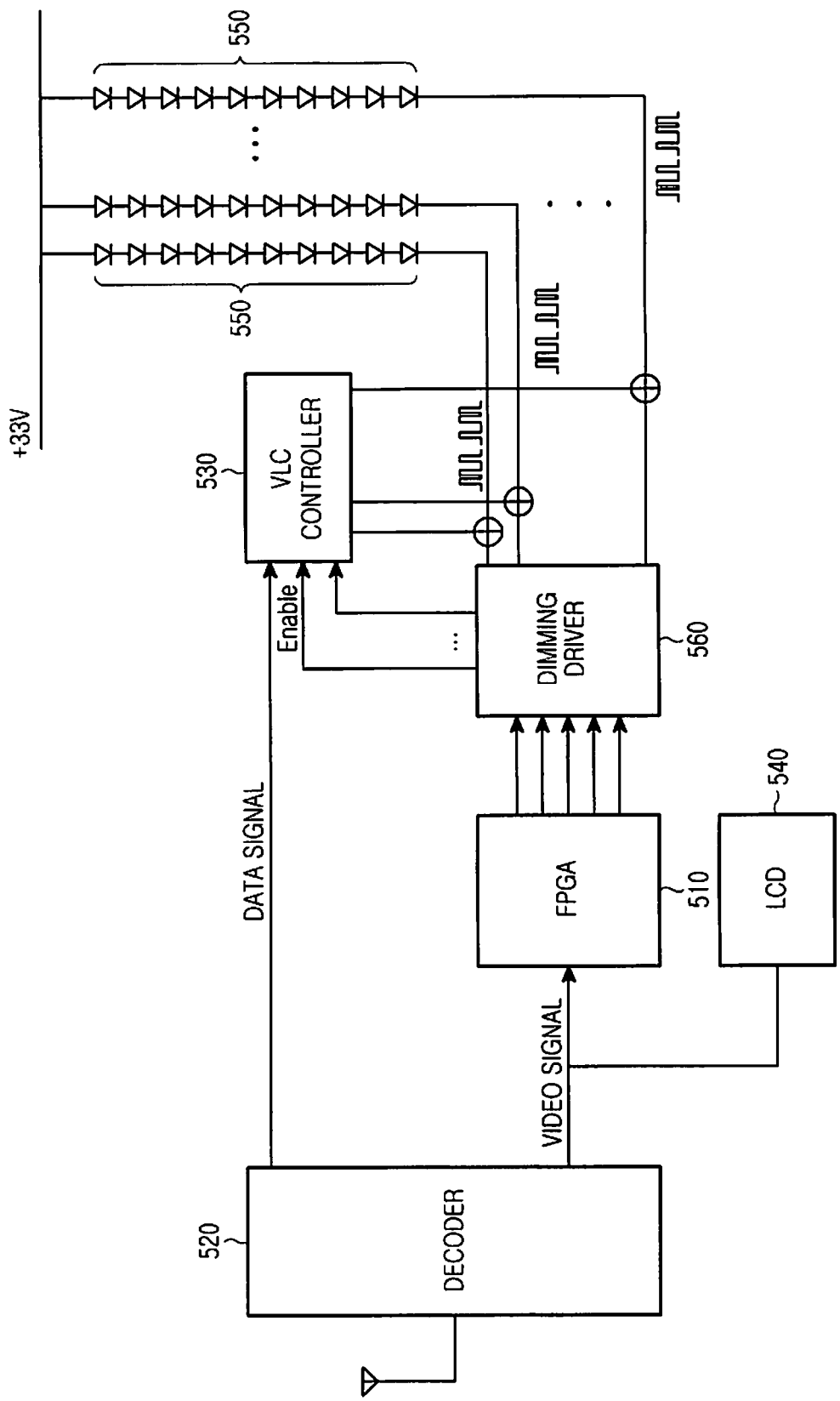
FIG. 5 is a block diagram of a device for providing additional information in an LCD TV with an LED BLU employing a local dimming technique, according to another embodiment of the present invention.

As shown in FIG. 5, a device for providing additional information, includes a decoder 520, an FPGA 510, an LCD 540, a VLC controller 530, a plurality of LED blocks 550, and a dimming driver 560 for controlling the brightness of a screen by PWM.

In another embodiment of the present invention, a PWM signal of each of the LED blocks 550, output from the dimming driver 560 for local dimming, is input as an enable signal of the VLC controller 530. Accordingly, the device for providing additional information, can carry and deliver a data signal over only an interval of PWM signal transmission in each of the LED blocks. In other words, over an interval where a PWM signal is '1', the VLC controller 530 is enabled, an encoded data signal to be included in a corresponding LED block is output, and the transmitted signal is added to the signal output from the dimming driver 560 via the FPGA 510. Meanwhile, over an interval where a PWM signal is '0', the VLC controller 530 stops data transmission, and then resumes the transmission over another interval where a PWM signal is '1'.

Components of the device for providing additional information of this embodiment of the present invention operate in the same manner as the device described in FIG. 4 and accordingly the explanations are omitted here.

Figure 6:
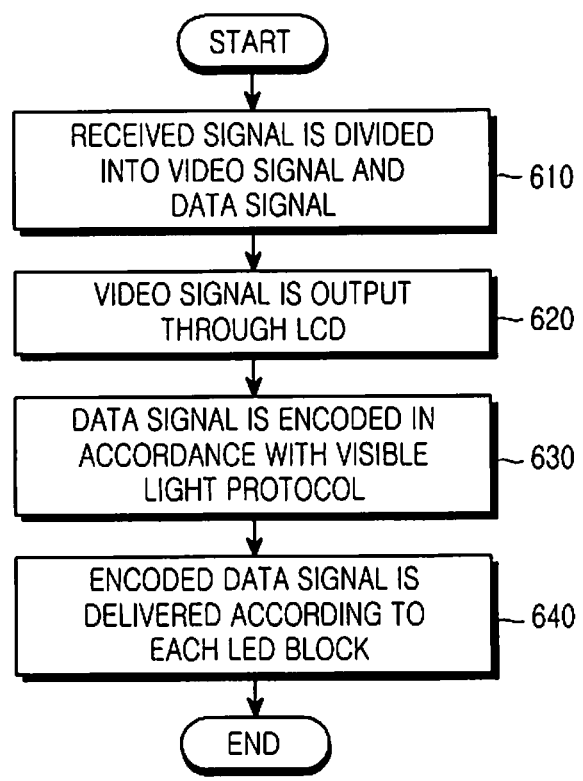
FIG. 6 is a flow diagram illustrating an operation for providing additional information in an LCD TV with an LED BLU employing a local dimming technique, according to an embodiment of the present invention.

Referring to FIG. 6, a decoder divides a received signal into a video signal and a data signal in step 610. Herein, the video signal is information to be displayed through an.

LCD and the data signal is a signal including additional information to be delivered through visible light communication. Also, the data signal may include different information according to respective areas so that the information can be differently delivered according to the respective areas of a display screen.

In step 620, the video signal is displayed through the LCD. Also, the video signal may be transmitted to the FPGA and used for local dimming. In step 630, the data signal is encoded through a visible light communication protocol in the VLC controller. In step 640, the encoded data signal is delivered as a visible light signal through a corresponding LED block. As described with reference to FIG. 5, the LED block may be configured so that the VLC controller outputs the data signal only when the PWM signal is output from the dimming driver.

Figure 7:
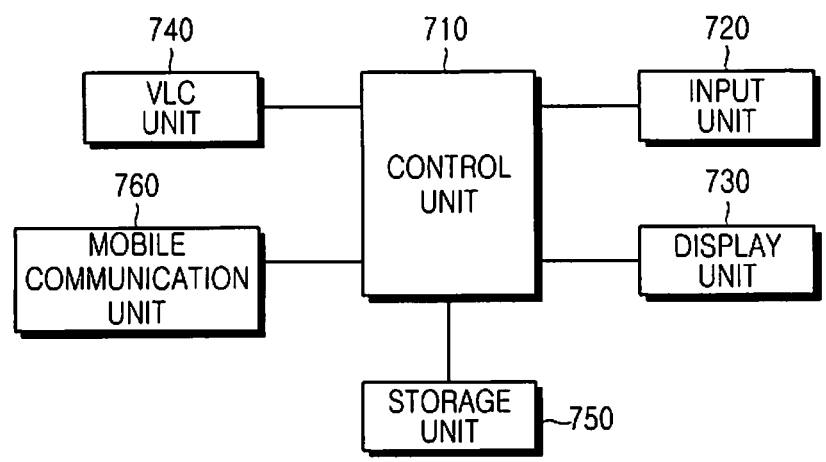
FIG. 7 is a block diagram of a terminal for receiving additional information provided from an LCD TV, according to an embodiment of the present invention.

Referring to FIG. 7, the terminal for receiving additional information provided from a display device according to an embodiment of the present invention includes a control unit 710, a VLC unit 740, an input unit 720, a display unit 730, a storage unit 750, and a mobile communication unit 760.

The input unit 720 receives input of a user's operating signal, such as key input or voice input, and transfers the signal to the control unit 710.

The display unit 730 outputs various kinds of display data generated from the terminal. In an embodiment of the present invention, the display unit 730 displays additional information extracted from a visible light signal received from an LCD TV.

The storage unit 750 stores various kinds of information required for operating the terminal. Also, in one exemplary embodiment of the present invention, the storage unit 750 may store additional information extracted from a visible light signal received from an LCD TV.

The mobile communication unit 760 takes charge of transmission/reception of audio data, text data, video data, control data, or the like of a terminal under the control of the control unit 710. For this, the mobile communication unit 760 includes an RF transmitter (not shown) for upconverting and amplifying a frequency of a transmitted signal, and an RF receiver (not shown) for low-noise-amplifying a received signal, and downconverting a frequency of the received signal, or the like.

The VLC unit 740 includes a visible light transmitter (not shown) including a light emitting element, such as an LED and/or a Laser Diode (LD), and a visible light receiver (not shown) including a light receiving element, such as a photo diode so as to perform transmission/reception of a visible light communication signal. The VLC unit 740 includes an encoder (not shown), and a modulator (not shown) to encode a signal to be transmitted in accordance with a visible light protocol during transmission of visible light communication, and also includes a decoder (not shown) and a demodulator (not shown) to decode of a received signal during the reception of visible light communication. Also, in one exemplary embodiment of the present invention, the VLC unit 740 receives a visible light signal delivered from a display device for providing additional information, such as an LCD TV, as described with reference to FIGS. 4 and 5, decodes the received visible light signal, and transfers the decoded signal to the control unit 710.

The control unit 710 controls the operation of each component of the terminal. In an embodiment of the present invention the control unit 710 receives a visible light signal output from a specific position of a display device through the VLC unit 740. The visible light signal output from the specific position of the display device is a visible light signal output from a BLU through a display panel. The visible light signal output from the specific position of the display device includes additional information on an object of an image currently displayed at the specific position on a screen according to a video signal. The object may include various types of objects to be displayed on the screen, such as characters, things, contents, icons, signs, regions, and symbols.

Also, the control unit 710 controls the received visible light signal to be decoded, extracts additional information from the decoded signal, and transfers the extracted information to the display unit 730 and the storage unit 750. Also, the control unit 710 may receive additional information from other external contents providers or servers through the mobile communication unit 760 with reference to a route or an address included in the extracted additional information data.

Figure 8:
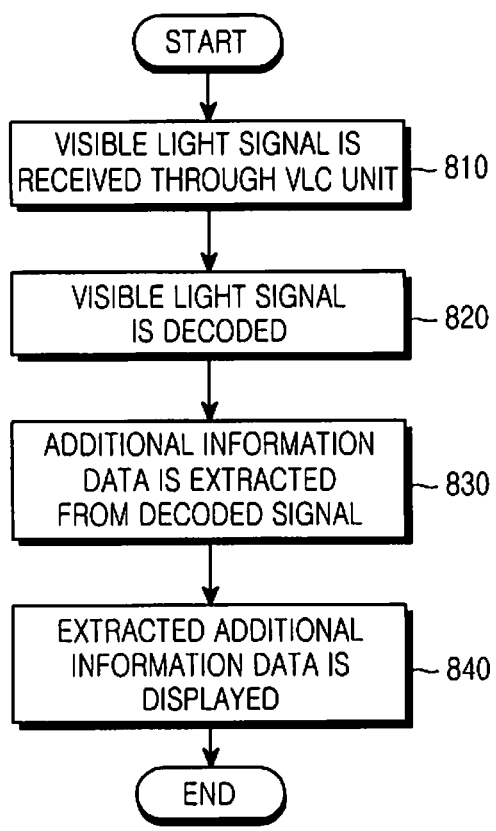
FIG. 8 is a flow diagram illustrating an operation of a terminal for receiving additional information provided from an LCD TV, according to an embodiment of the present invention.

Referring to FIG. 8, in step 810, when a terminal is positioned at a specific position on a screen of a display device, the terminal receives a visible light signal output from the specific position on the screen of the display device through the VLC unit. The visible light signal output from the specific position on the screen includes additional information on the object of the image currently displayed at the specific position on the screen. Next, in step 820, the terminal recovers a data signal by photoelectric-converting and decoding the received visible light signal, and in step 830, extracts additional information data from the decoded signal. Then, in step 840, the extracted additional information data is displayed on the display unit. In this case, the terminal may further retrieve additional information from other external contents providers or servers with reference to a route or an address included in the extracted additional information data, and display the retrieved additional information.

Accordingly, when a user watches a music video through the display device, additional information can include information of a corresponding singer, the title and lyrics of a corresponding song, and concert information, provided to the terminal through visible light communication. Also, it is possible to provide an interface for downloading MP3 files or music video files can provide a contents sale service to a user.

Also, when a user watches a preview of a movie through the display, the additional information can include movie reviews, the movie, provided through a visible light communication receiving terminal, and a service for reserving and paying for movie tickets can be provided along with an interface for downloading a movie trailer.

Also, when a user watches a home-shopping broadcast, it is possible to provide services, such as price information of a corresponding item, one-line one button order and pay, virtual fitting, search for identical or similar items, search for price comparison sites, through a visible light communication receiving terminal.

Also, for broadcasts, the provided various information can include connection to an advertiser website during an advertisement broadcast, information on a corresponding restaurant in a scene of the restaurant, information on an entertainer appearing on a broadcast, and information on clothes. Furthermore, other services, such as application for an event, on-line poll, coupon download, can be provided.

Also, the terminal can store such additional information data in the storage unit, and may transmit a user's input data based on such data, to the display device outputting the additional information through the VLC unit. In such a case, bi-directional communication between the display device and the terminal can be carried out, and the display device is further provided with a visible light receiving unit for receiving visible light communication.

In the present invention, through the above described configuration and operation, an LED which has performed only a role of a backlight of a conventional display, is provided with a communication function using visible light communication, and thus its utilization is improved. Also, a user can watch a display screen through the display device and can simultaneously receive various additional information via the visible light communication receiver by a communication function. Also, since different information can be delivered from the respective LED blocks, a user can selectively receive required information from the contents displayed on the screen.

In the present invention, in a display device using an LED as a back light, such as an LCD, a projection TV, or the like, additional information is delivered according to each part of a display screen by using visible light communication. Thus, there is an advantage in that a user can watch the information displayed on the display screen while receiving corresponding additional information through a visible light communication receiver.

Accordingly, it is possible to provide not only a role of a backlight of a conventional display device but also a communication function for delivering data by using visible light communication, to an LED.

Also, when an OLED is used, it is possible to carry out visible light communication can be accomplished by a higher response speed. Furthermore, there is an advantage in that additional information can be transferred by a conventional display and visible light receiver.

Since different information can be delivered according to respective LED blocks, a user can obtain information by selectively receiving information according to the contents displayed on the screen.

A method and an apparatus for delivering additional information through a display, according to an embodiment of the present invention, are operated and configured as described above. While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A terminal for receiving additional information from a display device using visible light communication, the terminal comprising:

a visible light communication unit for receiving a visible light signal output at a specific position on a screen of the display device and decoding the received visible light signal being encoded in accordance with a visible light communication protocol, wherein the visible light signal comprises additional information on an object displayed on the specific position;

a control unit for extracting the additional information on the object displayed on the specific position on the screen of the display device, from the decoded signal; and a display unit for displaying display data corresponding to the extracted additional information, wherein the control unit receives further additional information on the object from an external contents provider with reference to a route included in the extracted additional information.

2. The terminal of claim 1, further comprising a storage unit for storing the extracted additional information.

3. The terminal of claim 1, wherein the object includes various types of characters, things, contents, icons, signs, regions, and symbols.

4. The terminal of claim 1, wherein the control unit provides, if a music video is playing on the display device, the additional information which includes at least one of a singer, a title, and lyrics and concert information of a corresponding singer, and provides an interface for downloading MP3 files or the music video.

5. The terminal of claim 1, wherein the control unit provides, if a preview of a movie is playing on the display device, the additional information which includes at least one of a movie review, information of the movie, and a service for reserving the movie and paying for movie tickets, and provides an interface for downloading a trailer of the movie.

6. The terminal of claim 1, wherein the control unit provides, if a home-shopping broadcast is playing on the display device, the additional information which includes at least one of price information, one-line one button order and pay, virtual fitting, search for identical or similar items, and search for price comparison sites.

7. The terminal of claim 1, wherein the control unit provides, if an advertisement broadcast is playing on the display device, the addition information which includes connection to an advertiser website, information on an entertainer appearing on the advertisement broadcast, information on clothing, and an application for an event, on-line poll, and coupon download.

8. A method for receiving additional information using visible light communication from a display device, the method comprising:

receiving, by a mobile terminal, a visible light signal output at a specific position on a screen of the display device, and decoding the received visible light signal being encoded in accordance with a visible light communication protocol, wherein the visible light signal comprises additional information on an object displayed on the specific position;

extracting the additional information on the object displayed on the specific position on the screen of the display device, from the decoded signal;

receiving, by the mobile terminal, further additional information on the object from an external contents provider with reference to a route included in the extracted additional information; and displaying display data corresponding to the extracted additional information through a display unit of the terminal.

9. The method of claim 8, further comprising displaying, if a music video is playing on the display device, the additional information which includes at least one of a singer, a title, and lyrics and concert information of a corresponding singer, and displaying an interface for downloading MP3 files or the music video.

10. The method of claim 8, further comprising displaying, if a preview of a movie is playing on the display device, the additional information which includes at least one of a movie review, information of the movie, and a service for reserving the movie and paying for movie tickets, and providing an interface for downloading a trailer of the movie.

11. The method of claim 8, further comprising displaying, if a home-shopping broadcast is playing on the display device, the additional information which includes at least one of price information, one-line one button order and pay, virtual fitting, search for identical or similar items, and search for price comparison sites.

12. The method of claim 8, further comprising displaying, if an advertisement broadcast is playing on the display device, the addition information which includes connection to an advertiser website, information on an entertainer appearing on the advertisement broadcast, information on clothing, and an application for an event, on-line poll, and coupon download.

* * * * *